(No Model.) C. H. COFFIELD. 2 Sheets—Sheet 2.
BIRD CAGE.
No. 410,401. Patented Sept. 3, 1889.
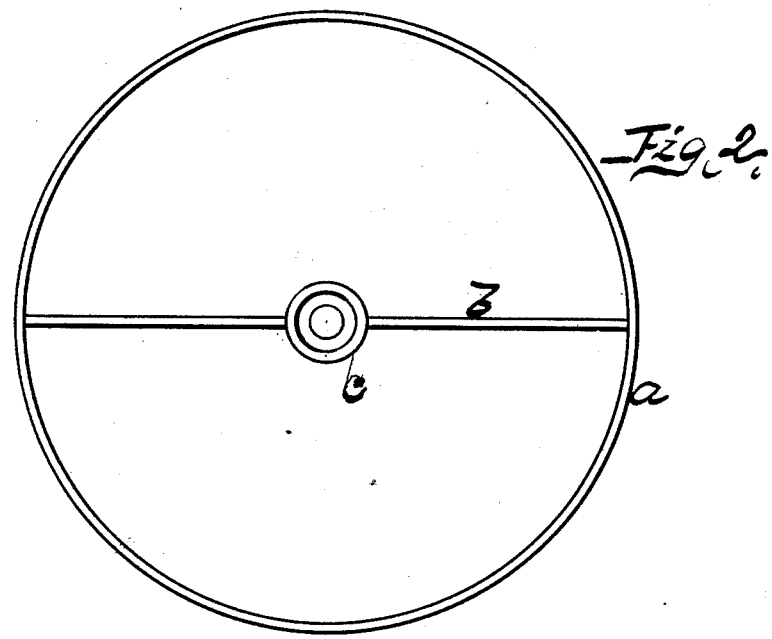
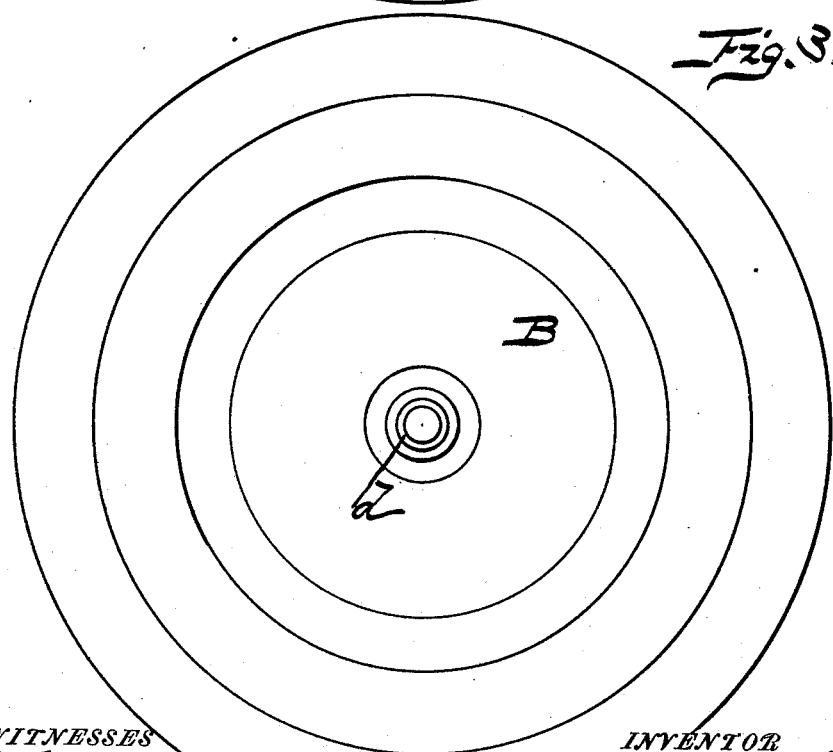
WITNESSES
Jas. B. Clark
S. S. Simpson
INVENTOR
C. H. Coffield
By C. H. Bates
Attorney

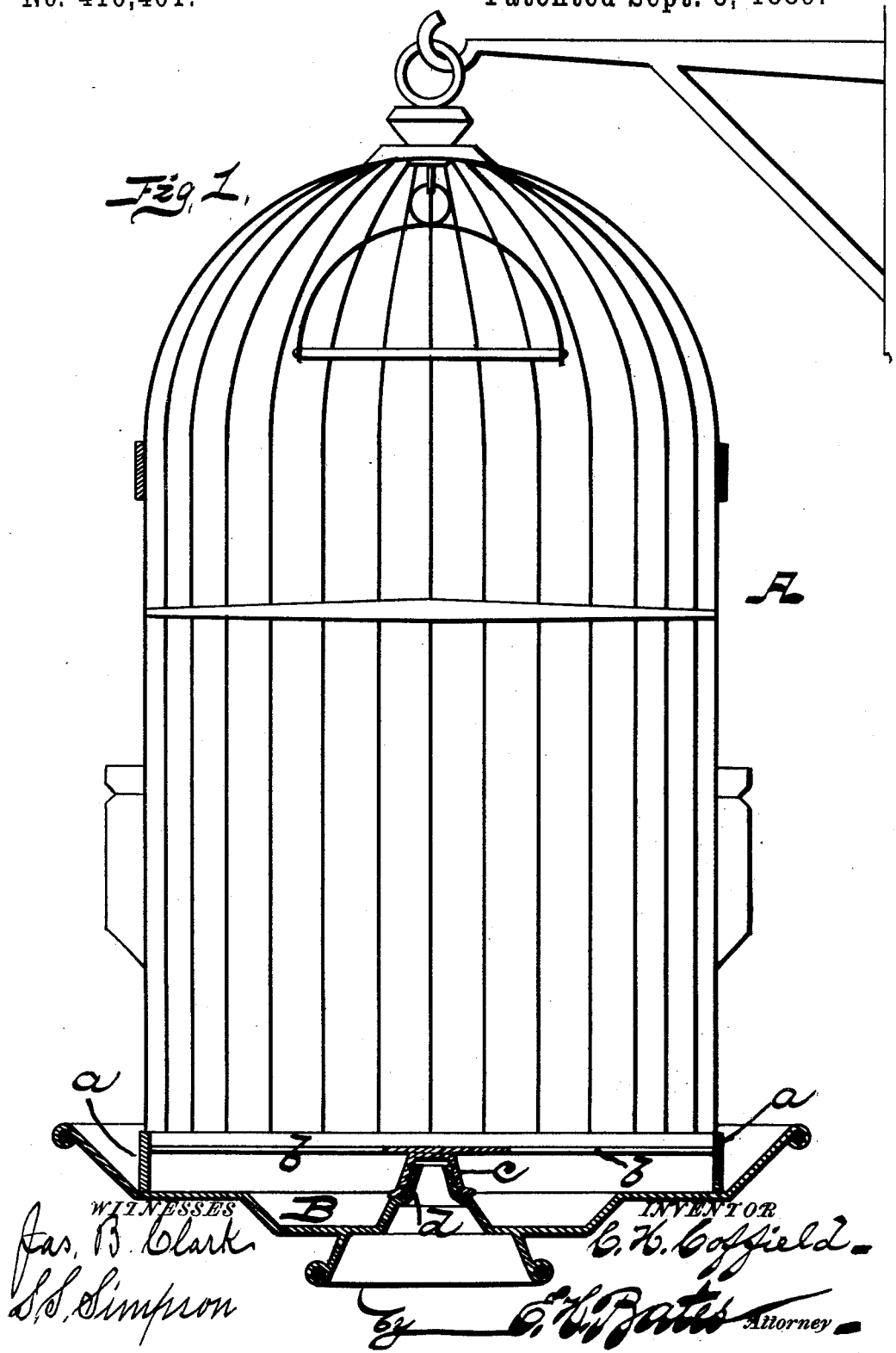

UNITED STATES PATENT OFFICE.

CHARLES HUNTER COFFIELD, OF ROCKDALE, TEXAS.

BIRD-CAGE.

SPECIFICATION forming part of Letters Patent No. 410,401, dated September 3, 1889.

Application filed May 1, 1889. Serial No. 309,195. (No model.)

*To all whom it may concern:*

Be it known that I, CHARLES HUNTER COFFIELD, a citizen of the United States, residing at Rockdale, in the county of Milam and State of Texas, have invented certain new and useful Improvements in Bird-Cages; and I do hereby declare the following to be a full, clear, and exact description of the invention, such as will enable others skilled in the art to which it appertains to make and use the same.

My invention relates to bird-cages of the circular kind, wherein the main-frame wires have a band at their lower ends and a single tie-wire arranged diametrically across the band.

The object of my invention is, mainly, to utilize the single diametrical tie-wire as a support for an inverted interiorly screw-threaded connecting-cap, and to combine with such a device a pan having a male screw-threaded portion formed integral with the removable pan, as will be understood from the following description and claim, taken in connection with the annexed drawings.

The annexed drawings, to which reference is made, fully illustrate my invention, in which—

Figure 1 represents a vertical sectional view of my device. Fig. 2 is a bottom view of the cage, and Fig. 3 is a plan view of the cage-bottom.

Referring by letter to the accompanying drawings, A designates a cage, which may be of the usual construction, having the usual lower band or rim $a$. To this rim or band I secure a rod $b$, which extends across the inside of said rim, and to the central portion of this rod is secured a cap $c$, which is female screw-threaded, that engages male threads $d$, secured to the central portion of the bottom B, as shown in the drawings.

It will be observed from the above description, taken in connection with the annexed drawings, that I combine with the ordinary well-known bird-cage, which has a base-band $a$, a single tie-wire $b$ for said band, which serves a double purpose—to wit: it prevents buckling of the band and it affords an attachment for a central inverted interiorly screw-threaded cap $c$. This device leaves perfectly free the pan B, and the wire affords a perch for a bird while picking. It will also be observed that the sub-base portion of the removable pan has formed integral with it a male screw-cap adapted to readily enter the female inverted cup $c$ and to unite the pan to the body of the cage. It will be finally observed that the inverted cap $c$ and the male portion $d$ of the pan are frusta of cones, the object of which construction is that the threads of the screws can readily be found and the parts united.

It will thus be seen that I connect the bottom to the cage by simply screwing it on, and remove the same therefrom by unscrewing the bottom, thus providing a simple, durable, and secure fastening, as well as being cheap to manufacture.

I am aware that it is well known in bird-cages to employ central engaging or locking devices for uniting the removable bottoms of the cages to the bodies thereof. I am also aware that Letters Patent No. 364,476, for a churn, shows a removable bottom secured to the body thereof by means of a cylindrical female screw-threaded socket and a cylindrical male screw-threaded portion. Such devices I broadly disclaim as my invention.

Having thus described my invention, what I claim, and desire to secure by Letters Patent, is—

As a new and improved article of manufacture, a bird-cage having the base-band $a$, to which the lower ends of the cage-wires are secured, a diametrically-bracing wire $b$, secured at its ends to the said band $a$, an inverted interiorly screw-threaded cap $c$, secured to said wire in the vertical central line of the cage, and a bottom B, having a screw $d$, adapted to enter the cap $c$, as specified.

In testimony whereof I affix my signature in presence of two witnesses.

CHARLES HUNTER COFFIELD.

Witnesses:
MAX WINTERBERY,
J. B. HAMILTON.